United States Patent
Cruanes et al.

(10) Patent No.: US 9,773,041 B2
(45) Date of Patent: Sep. 26, 2017

(54) METHODS AND APPARATUS OF SHARED EXPRESSION EVALUATION ACROSS RDBMS AND STORAGE LAYER

(71) Applicant: Oracle International Corporation, Redwood Shores, CA (US)

(72) Inventors: Thierry Cruanes, San Mateo, CA (US); Junyi Xie, Dobbs Ferry, NY (US); Yiu Woon Lau, New York, NY (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 499 days.

(21) Appl. No.: 13/787,663

(22) Filed: Mar. 6, 2013

(65) Prior Publication Data
US 2014/0258266 A1   Sep. 11, 2014

(51) Int. Cl.
*G06F 17/30*   (2006.01)
(52) U.S. Cl.
CPC .... *G06F 17/30463* (2013.01); *G06F 17/3046* (2013.01); *G06F 17/30442* (2013.01); *G06F 17/30466* (2013.01); *G06F 17/30489* (2013.01); *G06F 17/30498* (2013.01); *G06F 17/30516* (2013.01); *G06F 17/30545* (2013.01)
(58) Field of Classification Search
CPC ........... G06F 17/30463; G06F 17/3046; G06F 17/30442; G06F 17/30516
USPC ........ 707/706, 713, 714, 715, 718, 719, 721
See application file for complete search history.

(56) References Cited

U.S. PATENT DOCUMENTS

| | | | |
|---|---|---|---|
| 7,031,994 B2 | 4/2006 | Lao et al. | |
| 7,496,589 B1 | 2/2009 | Jain et al. | |
| 7,680,784 B2 * | 3/2010 | Furuya et al. | 707/999.004 |
| 7,693,820 B2 * | 4/2010 | Larson | G06F 17/30457 |
| | | | 707/999.002 |
| 7,716,215 B2 * | 5/2010 | Lohman et al. | 707/721 |

(Continued)

OTHER PUBLICATIONS

Ailamaki, Anastassia, et al, "Weaving Relations for Cache Performance," Proceedings of the 27th International Conference on Very Large Data Bases, Rome, Italy, Sep. 11-14, 2001, 14 pages.

(Continued)

*Primary Examiner* — Dangelino Gortayo
(74) *Attorney, Agent, or Firm* — Hickman Palermo Becker Bingham LLP

(57) ABSTRACT

Techniques are provided for sharing expression evaluation across a database management system and a storage layer. According to an embodiment, a plurality of target operators are identified that include a common expression. Each respective target operator corresponds to a step that evaluates the common expression during query execution. The plurality of target operators are modified to enable sharing of an evaluation result of the common expression. The query is executed according to the target operators. During query execution, the evaluation result is shared by the target operators. In other embodiments, the evaluation of the common expression is pushed to a storage layer. During query execution, a database management system retrieves the evaluation result of the common expression from the storage layer.

21 Claims, 9 Drawing Sheets

(56) References Cited

U.S. PATENT DOCUMENTS

| | | | |
|---|---|---|---|
| 7,844,608 B2 * | 11/2010 | Natkovich | G06F 17/3046 707/737 |
| 7,849,073 B2 * | 12/2010 | Young-Lai | G06F 17/30445 707/713 |
| 7,984,043 B1 * | 7/2011 | Waas | 707/718 |
| 8,224,806 B2 * | 7/2012 | Al-Omari | G06F 17/30433 707/713 |
| 8,285,709 B2 * | 10/2012 | Candea | G06F 17/30442 707/706 |
| 8,356,027 B2 * | 1/2013 | Jaecksch et al. | 707/713 |
| 8,538,953 B2 * | 9/2013 | Lee | G06F 17/30516 707/714 |
| 8,626,745 B2 * | 1/2014 | Okamoto | G06F 17/3046 707/715 |
| 8,635,206 B2 * | 1/2014 | Barbas | G06F 17/3046 707/713 |
| 8,688,683 B2 * | 4/2014 | Simon | G06F 17/30463 707/713 |
| 8,812,487 B2 * | 8/2014 | Krishnamurthy et al. | 707/718 |
| 8,832,142 B2 | 9/2014 | Marwah et al. | |
| 8,990,335 B2 * | 3/2015 | Fauser | G06F 17/30286 707/713 |
| 2008/0133465 A1 * | 6/2008 | Lee | G06F 17/30929 707/999.002 |
| 2012/0096054 A1 * | 4/2012 | Egan | G06F 17/30902 707/812 |
| 2013/0054567 A1 * | 2/2013 | Graefe | G06F 17/30463 707/714 |

OTHER PUBLICATIONS

Elmasri, et al., "Fundatmentals of Database Systems," Third Edition, Addison-Wesley Longman, Inc., Copyright © 2000, ISBN-0-8053-1755-4, pp. 32, 70, 118, 131-132, 134, 155-159, 170, 252-254, 558, 569-573, 591-592, and 789-790 (26 pgs).

* cited by examiner

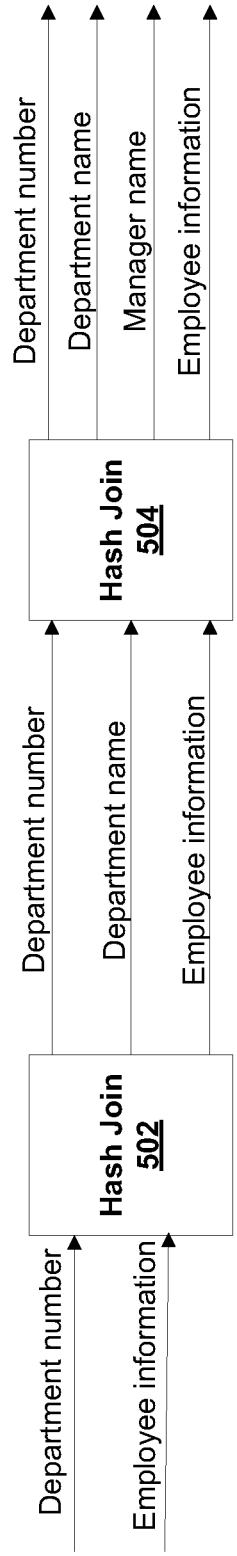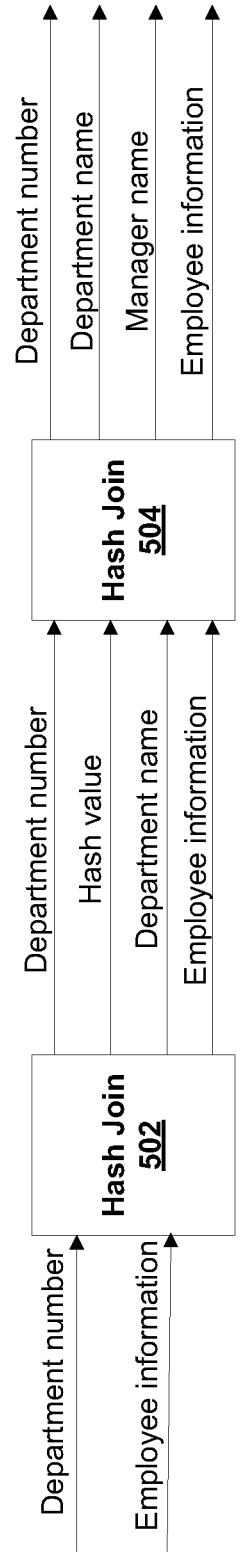
FIG. 5A
FIG. 5B

METHODS AND APPARATUS OF SHARED EXPRESSION EVALUATION ACROSS RDBMS AND STORAGE LAYER

FIELD OF THE INVENTION

The present disclosure relates generally to techniques for evaluating query expressions and, more specifically, to techniques for sharing evaluated expressions across a database management system and storage layer.

BACKGROUND

A database comprises data and metadata that are stored on one or more storage devices, such as a set of hard disks. The data within a database may be logically organized according to a variety of data models, depending on the implementation. For example, relational database systems typically store data in a set of tables, where each table is organized into a set of rows and columns. In most cases, each row represents a distinct object, and each column represents a distinct attribute. However, other data models may also be used to organize the data.

A database management system (DBMS) is software that controls access to data in a database. The DBMS is configured to receive and process a variety of database commands, often referred to as queries. In many implementations, the DBMS supports queries that conform to a structured query language (SQL). SQL is a standardized query language for managing data in a relational DBMS (RDBMS).

SQL includes two distinct sets of commands: Data Definition Language (DDL) for managing and indexing data structures in the database; and Data Manipulation Language (DML) for accessing and manipulating data residing within the data structures. DDL is typically used to create, alter, and delete database objects, such as tables, indexes, views, and constraints, whereas DML is typically used to add, update, and delete data in existing database objects.

When the DBMS receives a query, such as a SQL expression, the DBMS evaluates the query to obtain a query result. Query evaluation includes two stages: query compilation and query execution. During query compilation, the DBMS parses the SQL expression and generates a query execution plan. The query execution plan specifies an ordered set of steps, frequently represented as a tree of query operators, used to execute the query. The query operators at each step are associated with one or more expressions that represent computations or other actions that will be performed upon query execution. Example SQL operators include, without limitation, table scans, joins, table queues, group-by operations, and bloom filters. Once the query execution plan is generated, the query is executed according to the plan.

In one approach to query evaluation, the expressions of each query operator are independently and separately evaluated. For example, if a query execution plan includes multiple hash join operators, each hash join operator independently computes a hash value using an internal hash function. This approach provides a simple and straightforward way to execute a query. However, this approach can lead to inefficient use of processing and memory resources when computationally expensive operations are redundantly computed. In the preceding example, for instance, where the query execution plan includes multiple hash joins, some or all of the operators may use the same join key. Evaluating each hash join independently leads to redundant computation of a hash value from the same join key. That is, the DBMS will compute the hash value for each corresponding hash join in the query execution plan. As hashing is a computationally intensive task, the execution overhead can become significant when the number of hash computations required by an execution plan is large. In a similar manner, redundant evaluation of other expressions may also negatively impact query execution overhead.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 5A and 5B are block diagrams depicting an example dataflow modification according to an embodiment;

DETAILED DESCRIPTION

Figure 1:
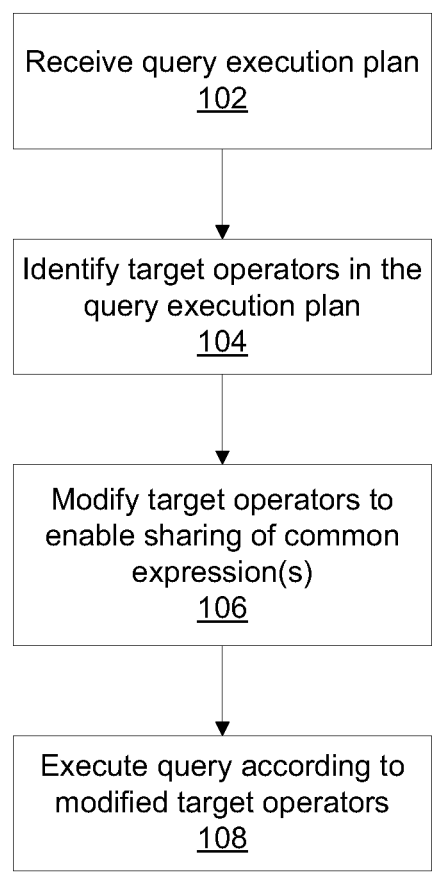
FIG. 1 is a flowchart illustrating a process for sharing expressions among target operators, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In a given query execution plan, multiple operators at times rely on common expressions to perform a corresponding function. Traditionally, these operators performed such computations internally without regard to expression found in other operators of the given execution plan. For example, a group by, hash join, bloom filter, and table queue all rely on hash computations for different purposes. When a query execution plan including two or more of these operators is initially formulated, the hash computation is performed at each corresponding step. In some instances, the hash algorithm used by each operator is different. Thus, the computed hash value of one operator may be different and incompatible with the computed hash value of another operator.

According to techniques described herein, a DBMS is configured to identify common expressions across different query operators in a query execution plan. Once identified, the query execution plan is modified to enable shared expression evaluation amongst the different query operators.

Instead of evaluating the common expression multiple times, the modification of the execution plan causes the expression to be evaluated a single time along a given dataflow in the query execution plan. The evaluation results are passed to subsequent operators in the dataflow to avoid repeated evaluation.

The type of expressions that are shared within a query execution plan may vary from implementation to implementation. In an embodiment, hash computations on a common hash key are shared across operators in the execution plan. For example, if a given dataflow in an execution plan includes a group-by, table queue, hash join and/or other operators that hash on the same key, then the execution plan is modified to enable hash value sharing among these different operators. Before or during query execution, the hash value is computed once according to the modified query execution plan. The computed hash value is then shared and used by the appropriate operators of the given dataflow.

In another embodiment, the DBMS is configured to leverage storage-layer support to offload evaluation of shared expressions. After the DBMS has identified the shared expression(s), the corresponding computations are pushed from the DBMS to the storage-layer. Pushing shared expressions to the storage-layer frees the DBMS from costly computations and reduces query execution overhead.

Common Expression Sharing

In an embodiment, the DBMS identifies operators within the query execution plan that are entitled to share common expression evaluation. These operators are referred to herein as "target operators." The set of target operators that are entitled to share a common expression is herein referred to as a "share set." Target operators are entitled to share common expressions, and thus form a share set, when the result of a computation or other internal function of one target operator can be used by all other target operators within the share set.

In an embodiment, the target operators are part of a "share path". A share path is a chain of operators that represent a dataflow that includes the evaluated result. Thus, the evaluated result is passed from one operator to another along the share path. The share path may include operators that are not part of the share set. For instance, an operator may not include the common expression and thus may not use the evaluation result. However, the operator may still pass the evaluation result along the share path to other target operators in the share set.

In an embodiment, the DBMS factorizes common expressions in the query execution plan. Specifically, the DBMS identifies common expressions across the different operators and externalizes the evaluation of these common expressions. Accordingly, the common expression is no longer computed internally by the target operators. Instead, the expression is evaluated externally, and the evaluation result is passed as an input to the operator. Thus, the expression may be evaluated a single time and used by each target operator in the share set.

FIG. 1 is a flowchart illustrating a process for sharing common expressions among target operators, according to an embodiment. In step 102, a query execution plan for a particular query is received. The query execution plan includes a plurality of operators that involve internal computations or other expressions.

In step 104, the query execution plan is traversed to identify which operators share a common expression. These operators are the target operators that form a share set. In some instances, there may be multiple share sets within a query execution plan. For example, a first share set may include target operators that share a first expression. The second share set includes target operators that share a second expression that is different than the first expression.

In step 106, the target operators are modified to enable sharing of the common expression. In an embodiment, this step includes assigning the responsibility of computing or otherwise evaluating the common expression. The operator that is assigned this responsibility is referred to herein as a "compute node". The compute node passes the results from evaluating the expression to other nodes in the share set. If there are multiple share sets within the query execution plan, then there will be a compute node for each share set. Each compute node shares the results of the computation with other target operators within the same share set.

In step 108, the query is executed according to the modified query execution plan. During this step, the compute node evaluates the common expression, and the result is shared with other target operators in the share set. In an alternative embodiment, the evaluation of the common expression is pushed to the storage layer, and the DBMS retrieves the evaluation result from the storage layer. The evaluation result is passed along a share path from the compute node to other target operators in the share set.

Different types of operators use the evaluation result differently in accordance with the operator's internal expressions. For example, in output table queue, a shared hash value is used to compute consumer slave identifiers whereas in a hash join, the same shared hash value is used to build a hash table (build side) or probe a hash table to join rows (probe side).

Hash Value Sharing

In an embodiment, the DBMS is configured to identify and factorize common hash value expressions across different query operators. Any operator that relies on hash computations can support hash value sharing. Examples include, without limitation, group by operations, hash joins, bloom filters, and table queues.

Operators that apply a hash function to a common hash key are entitled to hash value sharing. For instance, two or more operators may hash on the same column of a table within a database. If these operators are in the same dataflow of a query execution plan, then these operators are entitled to share the computed hash value.

Target Operator Identification

In an embodiment the DBMS traverses a query execution plan to identify operators that are entitled to share expression evaluation. Once the DBMS identifies these operators, the DBMS marks and/or otherwise modifies these operators to enable hash value sharing during query execution.

Figure 2A:
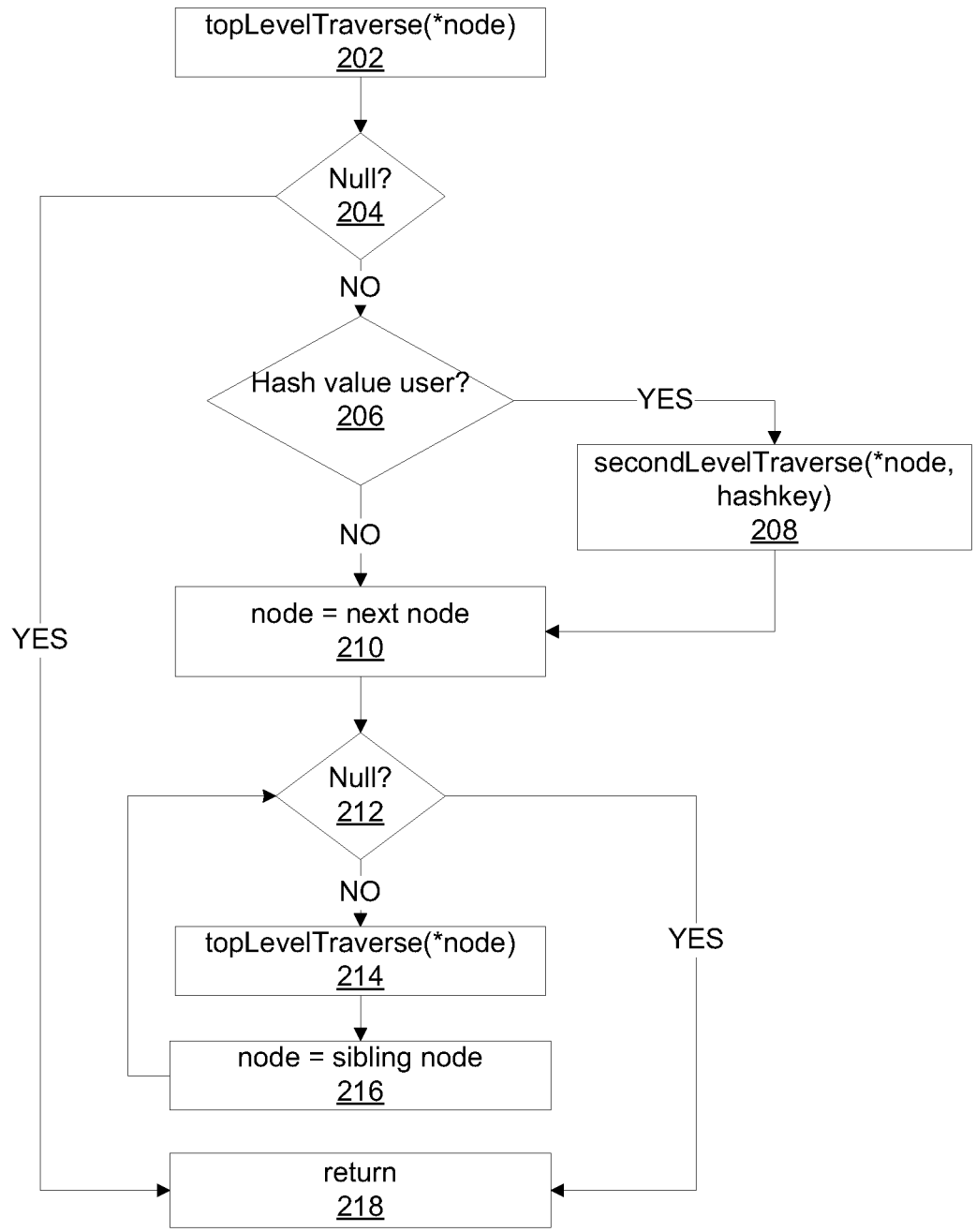
FIGS. 2A and 2B are flowcharts illustrating a traversal routine for identifying target operators in a query execution plan, according to an embodiment.
Figure 2B:
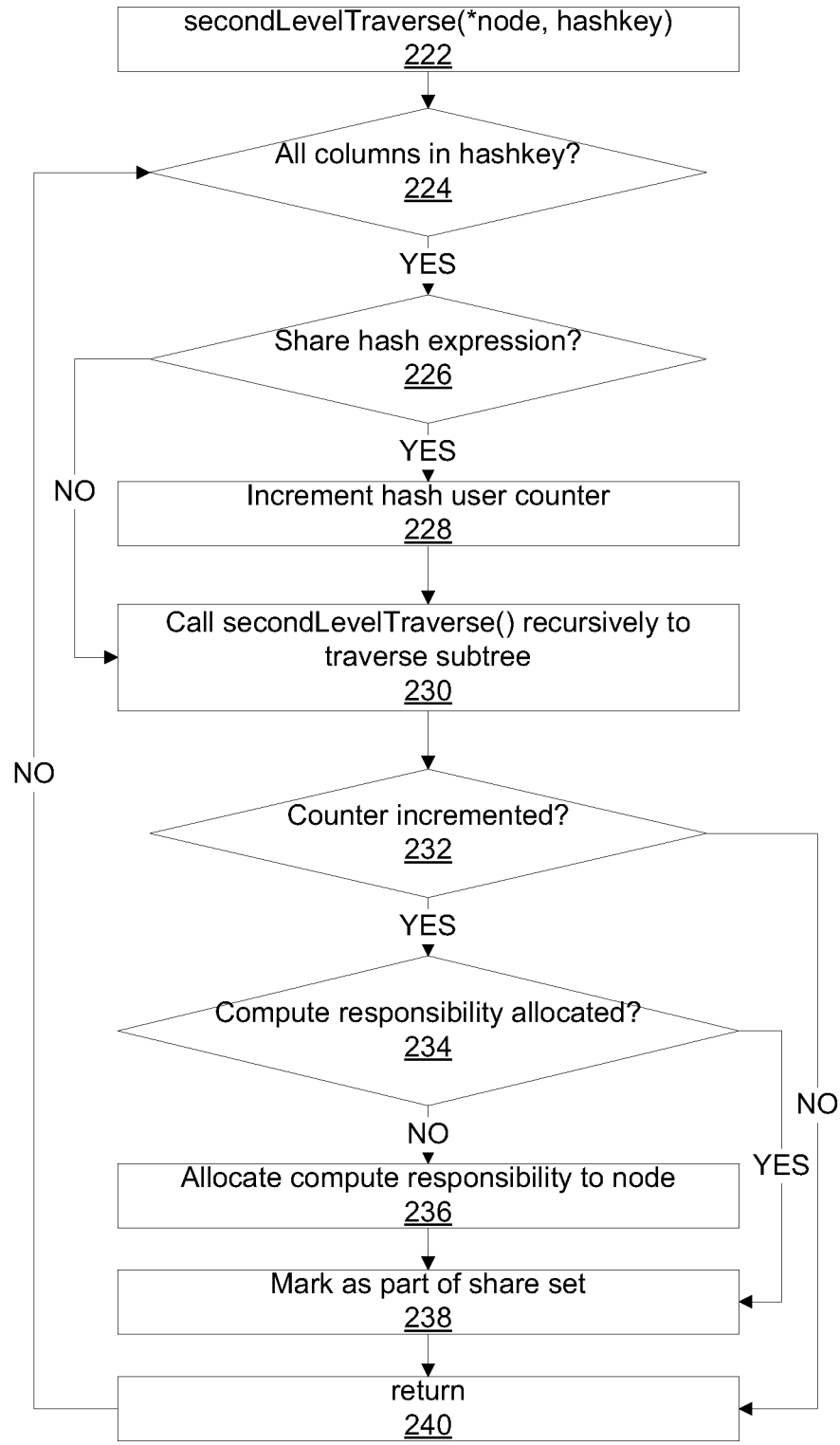

FIGS. 2A and 2B depict an example traversal routine to identify operators that are entitled to hash value sharing, according to an embodiment. The traversal routine is a two-level nested top down traversal of a query execution plan. FIG. 2A depicts a flowchart of the top-level traversal, and FIG. 2B depicts a flowchart of the second-level of traversal.

The top-level traversal is responsible for identifying root hash-user nodes within the query execution tree. A root hash-user node is a node that involves a hash computation and has not yet been marked or otherwise modified for hash-value sharing. In other words, the root hash-user node is the first identified node in a set of nodes that share hash computations. Multiple root hash-user nodes and hash sets may exist within a query execution plan. For instance, one share set in the execution plan may hash on a first hash key, while a different share set hashes on a second hash key. Each share set has a root hash-user node.

Referring to FIG. 2A, at step 202, the top-level traversal routine receives a pointer to a node in the query execution tree that has not previously been modified for hash-value sharing. In step 204, the traversal routine performs an initial null check to determine whether the node is valid. If the node is null, then the routine returns at step 218. If the node is not null, then the process continues to step 206. At step 206, the traversal routine determines whether the node, referred to herein as node R, is a hash-user. A hash-user is a node that has a corresponding expression that uses a hash value. If node R is a hash-user, then a routine to perform the second-level of traversal is called at step 208. The second-level of traversal starts from node R and traverses downward along the query execution tree until the routine identifies all descendent nodes that can share the hash value with R. The second-level of traversal is described further below with reference to FIG. 2B. If node R is not a hash-user, then the process continues to step 210, where a pointer to a next node, NN, in the query execution tree is obtained. The next node is a descendant node of node R. In step 212, the traversal routine determines whether node NN is null. If it is null, then the end of a query execution tree branch has been reached, and the process returns at step 218. If the node is not null, then the process recursively calls the top-level traversal routine at step 214, passing the node NN as the input value to the routine. Thus, the top-level traversal routine is performed on node NN to determine whether it is a root hash-user node. At step 216, pointers to siblings of node NN are obtained. The process returns to step 212, and the top-level traversal routine is performed on all non-null value nodes that are descendants of node R and siblings of node NN. Accordingly, the entire query execution tree may be traversed to identify all root hash-user nodes.

The second-level traversal is responsible for identifying hash users that share the same hash keys as node R. Nodes that share the same hash keys are part of the same share set. When the second-level traversal reaches a node N by traversing down a query execution tree from root hash user R, there are three cases.

In case 1, node N's row vector does not have all columns of node R's hash key. If this is the case, then the second-level traversal stops searching for hash-users in the same share set as node R.

In case 2 node N itself is not a hash-user but has all the hash keys of node R in an associated operator. If this is the case, then N itself does not use the hash value but may pass the shared hash values from N's child node up to N's ancestors. Accordingly, node N becomes part of a share path, but does not part of the share set. In this case, the second-level traversal continues traversing downward to a subtree of N.

In case 3, N is also a hash-user that shares the same hash key as R. In this case, N is part of the share set. A hash value counter that tracks the number of hash-users in the share set is then incremented, and the second-level traversal continues traversing downward to a subtree of N.

The three cases summarized above are depicted in FIG. 2B. Referring to FIG. 2B, in step 222, the second-level traversal routine receives a pointer to node N in the query execution tree and the hash key extracted from node R. In step 224, the traversal routine determines whether the node has all columns in R's hash key. If not, then, per case 1, the second-level traversal stops searching for hash-users in the same share set as node R, and the process returns to an upper level at step 240. If node N shares all columns in the hash key, then the process continues to step 226. In step 226, the traversal routine determines whether node N shares the hash expression. Node N shares the hash expression with other nodes in a share set if node N computes a hash value from the same hash key as other nodes in the set. If node N computes a hash value from a different hash key or does not compute a hash value, then per case 2, the node is not part of the share set, and the second-level traversal continues by recursively calling the second-level traversing routine at step 230 to traverse the subtree. Otherwise, per case 3, the node is part of the share set and the hash-user counter is incremented at step 228.

When traversing recursively into the subtree, the counter is updated for every hash-user node that is part of the same share set. When the routine returns from traversing N's subtree, then in step 232, the traversal routine checks the hash-user counter to determine whether the counter was incremented or not. This step determines whether the counter was incremented at the current level, incremented in traversing the sub-tree, or both. If the counter was incremented, then node N is modified so that the hash value can be passed to upper operators in the query execution plan. Thus, the process continues to step 234. Otherwise, the routine returns at step 240.

In step 234, the traversal routine determines whether the responsibility for computing the hash value has previously been allocated to a node within the share set. If not, then in step 236, the responsibility of computing the hash value is allocated to node N, and node N is marked as part of the share set. On the contrary, if the responsibility of computing the hash value has already been allocated to another node in the share set, then in 238 node N is marked as part of the share set without allocating the computation responsibility. In an embodiment, step 236 includes generating a shared hash expression, and step 238 includes appending a reference to the shared has expression to a row vector of the operator. The shared expression is described in more detail below.

In some instances, the DBMS parallelizes the execution plan to optimize query execution. In an embodiment, the traversal routine is performed after the plan parallelization. Hash key information for some operators, like table queue, become available after plan parallelization is complete. This key information is used to determine whether an operator can share a hash value with descendants. Thus, waiting until after plan parallelization facilitates target operator identification.

Query Execution Plan Modifications

During the traversal routine, a query compiler, optimizer, or other component of the DBMS modifies elements of the query execution plan to enable shared expression evaluation. The nature of the query execution plan modifications may vary from implementation to implementation.

In an embodiment, each target operator in a share set is marked with an identifier, such as a flag. Different types of flags can be used to demarcate different responsibilities within a share set. For example, a first flag, referred to as a share flag, is used for a hash-user node that is not responsible for computing a hash value. This flag indicates that the node will receive the hash value as an input instead of computing a new hash value internally. A second flag, referred to as an evaluate flag, means that the corresponding node is at the bottom of a hash value share path and thus is responsible for computing the hash value for the upstream hash-users in a corresponding share path.

Figure 3:
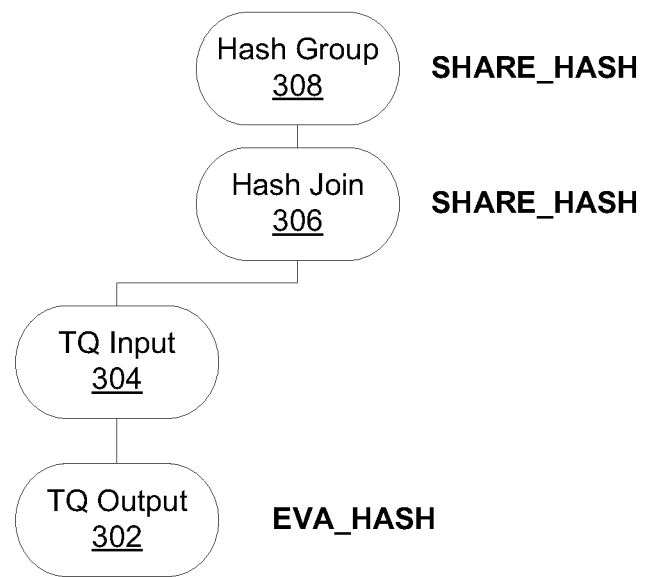
FIG. 3 is a block diagram depicting an example share path of a modified query plan, according to an embodiment.

FIG. 3 is a block diagram depicting an example share path of a modified query execution plan. In this path, output table queue 302, at the bottom of the chain, is associated with an evaluate flag. This node will compute the hash value for the target operators in the share set. Output table queue 302 passes the computed hash value to input table queue 304. Although input table queue 304 is not a hash-user, it is still part of the share path. Thus, input table queue 304 receives the computed hash value from output table queue 302 and passes this hash value to hash join operator 306. Hash join operator 306 and hash group operator 308 are both associated with the share flag. Accordingly, these operators rely on receiving a hash value input instead of computing their own hash values internally. Hash join operator 306 receives the hash value as input from input table queue operator 304. Hash join operator 306 uses the hash value to perform a join operation and passes the hash value to hash group operator 308. Hash group operator 308 uses the hash value to perform grouping and aggregation functions. At this point there are no remaining nodes in the share path.

In another embodiment, the target operators' internal expressions are replaced or otherwise modified. Nodes that include common expressions no longer keep those expressions internal. Accordingly, the query compiler replaces the internal expression with a reference to a shared expression.

Figure 4A:
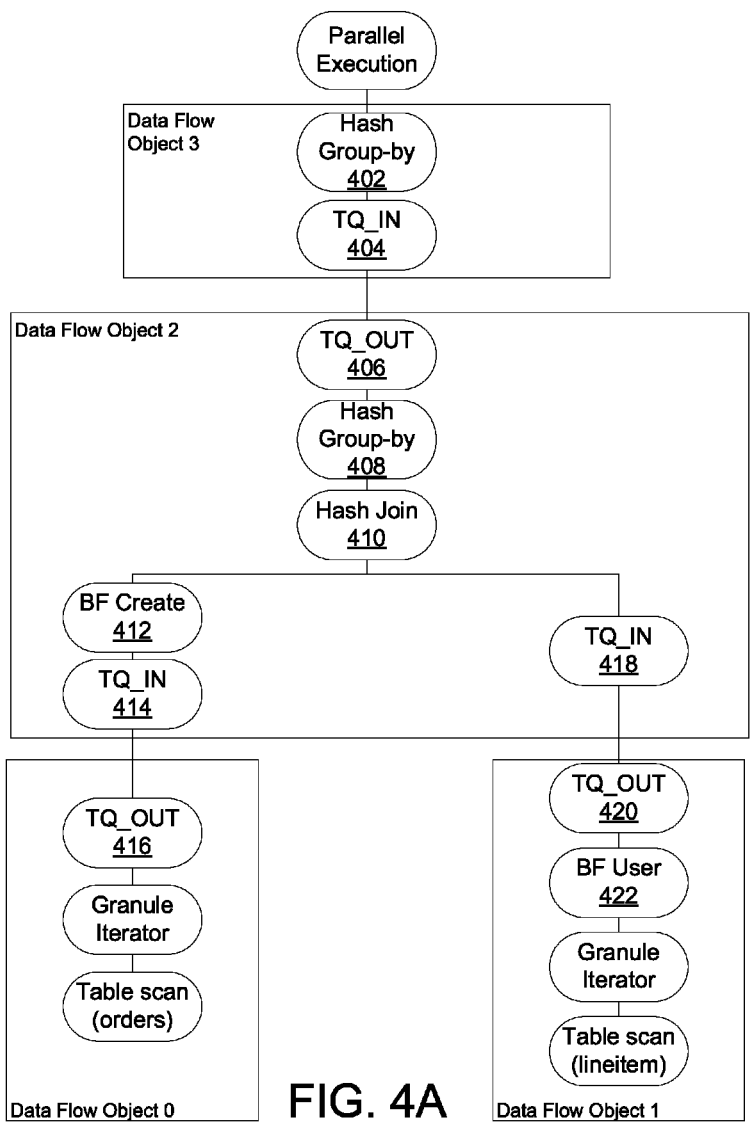
FIGS. 4A and 4B are block diagrams depicting an example modification to a query execution plan according to an embodiment.
Figure 4B:
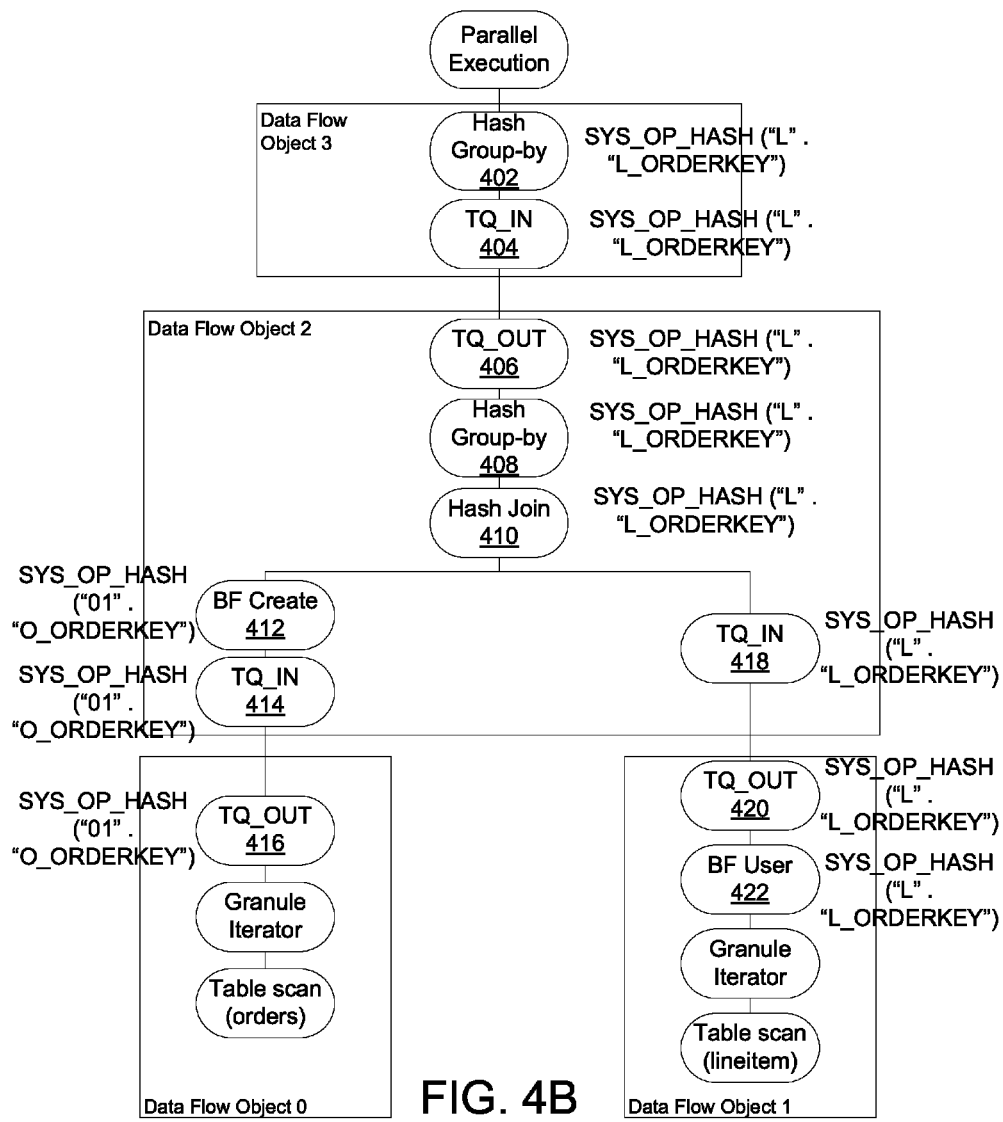

FIGS. 4A and 4B are block diagrams that depict an example modification to a query execution plan, according to an embodiment. FIG. 4A depicts the initial query execution plan that is generated for the following query

```
select l.1_orderkey, count (*)
from orders1 o1, lineitem2 l
where o1.o_orderkey = l.1_orderkey
group by l.1_orderkey.
```

The query execution plan includes multiple operators that are hash-users. These operators include hash group-by operators 402 and 408, output table queues 406, 416, and 420, hash join 410, bloom filter create 412, and bloom filter user 422. The traversal routine described above is applied to this query execution plan to modify the query execution plan.

FIG. 4B depicts the modified query execution plan after applying the traversal routine. There are two hash value share sets and two corresponding share paths. The first share path is on key O1.O_ORDERKEY; the hash value is computed by output table queue 416 and passed upward by input table queue 414, bloom filter create 412, and shared by hash join 410. Along the first share path, bloom filter create 412 and hash join 410 benefit from sharing the hash value computed by output table queue 416. The second share path is on key L.L_ORDERKEY: the hash value is computed by bloom filter user 422 and passed upward to output table queue 420, input table queue 418, hash join 410, hash group by 408, output table queue 406, input table queue 404. The top operator hash group-by 402 is the last operator using the share hash value computed by bloom filter user 422. Along the second share path output table queue 420, hash join 410, hash group-by 408, output table queue 406, and hash group-by 402 all benefit from sharing the hash value computed by bloom filter user 422.

The SYS_OP_HASH expression depicted in FIG. 4B is a new expression that replaces the internal hash expressions of the hash-users. The expression SYS_OP_HASH("L", "L ORDERKEY") represents a hash value operation defined on key L.L_ORDERKEY. The expression SYS_OP_HASH ("O1", "O_ORDERKEY") represents a hash value operation defined on key O1.O_ORDERKEY. These expressions are generated once for the bottom operator during the traversal routine. All ancestors along the share path append the new expression to their corresponding row vectors. The new expression acts as a reference to the shared hash value operation. Each target operator stores a copy of a pointer to the new hash expression. During runtime execution of the query, the DBMS transforms the expression to location information of the shared hash value. Each target operator may then use the location information to directly access the hash value.

Dataflow and Row Source Modification

In an embodiment, each operator is a row source. A row source represents one or more expressions that manipulate rows to generate another set of rows. Each row source has a set of input rows and a set of output rows. At execution, reading a row source tree from the bottom up yields a sequence of steps for performing the operations specified by the SQL statement. For each row source, the execution process applies internal expressions to the input rows to generate the set of output rows.

During the traversal routine, the DBMS modifies the input and/or outputs to the target row sources in the query execution plan. Specifically, a new input or output that includes the shared evaluation result is generated and inserted into the row vector of each of the row sources that are within the scope of sharing. For example, a shared hash value may be put in a new column that is cached or otherwise stored in memory. If the input is modified for a target operator, then each respective input row of the new input row vector includes a corresponding hash value. If the output is modified for a target operator, then each output row of the new output row vector includes a corresponding hash value.

FIGS. 5A and 5B are block diagrams depicting an example dataflow modification, according to an embodiment. FIG. 5A is an example dataflow before modification that depicts row source inputs and outputs for each corresponding row source. The query execution plan includes two hash join row sources: hash join 502 joins an employee table to a table that specifies a department name, while hash join 504 joins the results of hash join row source 502 to a table that specifies a manager name. The hash key in both instances is department number.

Before modification, the input to hash join 502 is department number and employee information from the employee table. During a build phase, hash join 502 applies a hash function to the department number to build a hash table that includes the employee information. During a probe phase, hash join 502 scans the department name table for matches with the hash table. The output of hash join 502 is the department number, department name, and the employee information. This output flows and serves as input to hash join 504. Hash join 504 applies a hash function to the department number to build its own hash table that includes the employee information and department name. During a probe phase, hash join 504 scans the manager name table for matches with the hash table. The output of hash join 504 is department number, department name, manager name, and the employee information.

FIG. 5B is an example dataflow after modification that depicts modified row source inputs and outputs for each corresponding row source. For hash join 502, the inputs remain unmodified. However, the output of hash join 502 is modified to expose the hash value that was computed during the build phase. Thus, the input of the hash join 504 now includes the hash value that was computed for hash join 502. Hash join 504 uses this hash value in the probe phase to find matches within the manager table.

In another embodiment, the hash value is computed by an external operator and serves as an additional input to hash join 502. Thus, instead of computing the hash value internally, hash join 502 may retrieve the computed hash value from another source. For example, hash value 502 may retrieve the computed hash value from the storage layer.

Threshold Sharing Test

The benefits of sharing evaluated expressions increase significantly as the number of target operators increase. When the number of target operators is small, the reduced computations may not justify the processing and storage overhead of sharing the evaluated expression.

In an embodiment, evaluated expressions are shared when the expression is common to a threshold number of target operators. The threshold may be adjusted to optimize system performance. For example, sharing may be justified when the query execution plan has three or more target hash-user nodes, but not when only two exist. The threshold may vary from implementation to implementation.

If a threshold is set, then the query execution plan is modified to enable sharing when the threshold is satisfied. If the threshold is not satisfied, however, then the query execution plan remains unchanged by the sharing logic. In the present example, for instance, the DBMS modifies the query execution plan according to the techniques described above if it identifies three or more hash-user nodes, but not when only two are identified.

Pushing Hash Value Computation to Storage

In an embodiment, computation of shared expressions is materialized at the storage layer. Thus, instead of the DBMS computing the shared expression, the DBMS notifies the storage layer of the shared expression. In response, the storage evaluates the shared expression. The storage layer returns rows that already include the evaluated expression to the DBMS.

Shared hash computations are one type of expression that can benefit from materialized expressions. In an embodiment, the DBMS is configured to push these shared computations to the storage layer. Whenever a hash value share path is constructed, the DBMS notifies the storage layer and appends a hash value operation to the expression list of the underlying table scan. In an embodiment, the hash value operation is appended when the query optimizer sets the evaluate flag to the bottom operator of a hash value share path.

Figure 6:
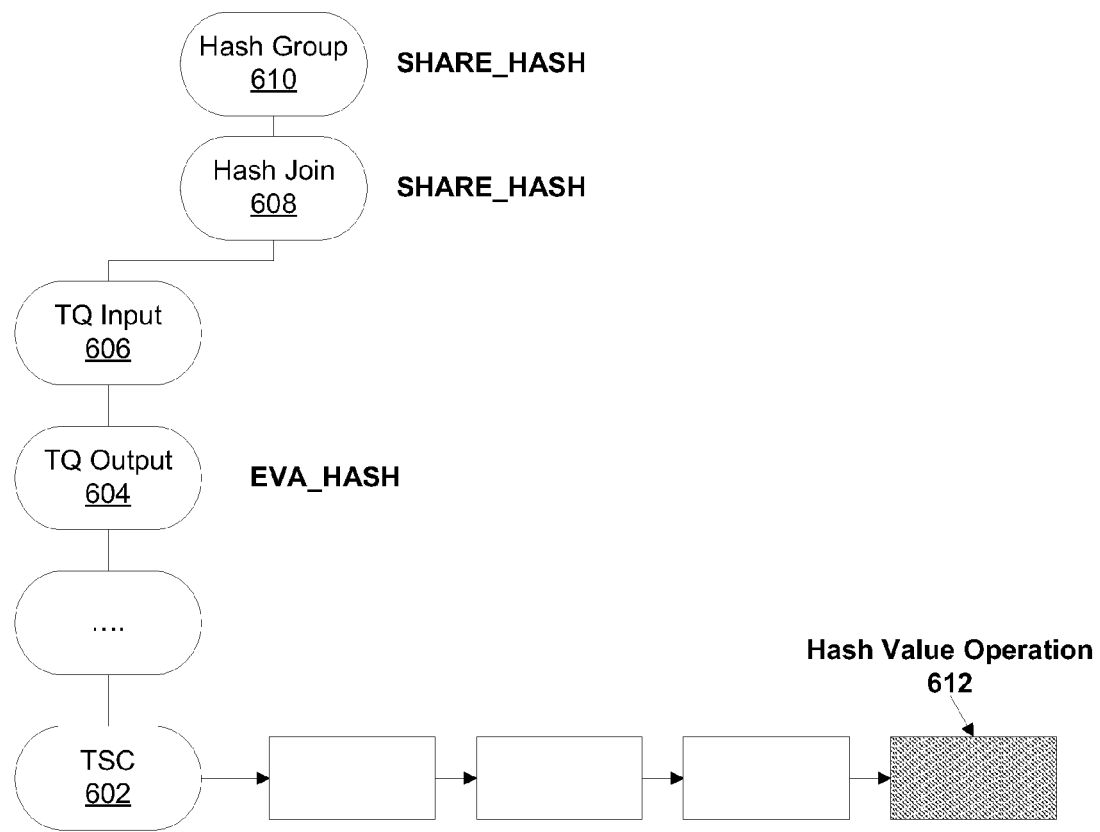
FIG. 6 is a block diagram depicting an example share path of a modified query execution plan where a hash value computation is pushed to a storage layer, according to an embodiment.

FIG. 6 is a block diagram depicting an example share path of a modified query execution plan where a hash value computation is pushed to the storage layer. The share path includes table scan 602, output table queue 604, input table queue 606, hash join 608, and hash group by 610. Output table queue 604 is the bottom row source in the share path and has a corresponding evaluate flag. Accordingly, hash value operation 612 is appended to underlying table scan 602. When this request is submitted to the storage layer, the storage layer computes the hash value in accordance with hash value operation 612. The storage layer computes the hash value and stores the hash value in a column. In response to the table scan operation, the storage layer returns rows that include the computed hash value. The table scan operator 602 passes the hash value up the share path depicted in FIG. 6.

Although output table queue 604 is the compute node in this instance, the computation is not performed by this operator. Rather, the underlying table scan notifies the storage layer of the expression, and the storage layer performs the evaluation. This allows the DBMS to use resources, which would have been consumed in computing the hash value, for other query processing operations.

Storage Layer

In an embodiment, the storage layer is one or more storage devices that are configured as a multi-node server for storing data, including database data, for one or more respective database servers. A storage device within the storage layer comprises one or more computing nodes referred to as storage device cells. Data managed and stored by the storage device is stored in persistent memory, such as hard disk drives or flash memory.

A storage device within the storage layer is a block mode device that provides a client, such as a respective database server, access to data in units referred to as a data block. A data block is the atomic unit of database data that a storage device client may request to read from the storage device. Data in the storage device is also organized by "storage data blocks". Storage data blocks that the storage device provides to a database server are copies of the version stored in persistent storage on the storage device.

The computing power of the storage device is exploited to perform commutable work on storage blocks in response to worked data requests by the respective database server. To request "worked data blocks", the database server transmits a "worked data block request" to a respective storage device. In an embodiment, these worked data block requests include requests to evaluate shared expressions that are identified by the database server. The storage layer accesses the data blocks that store the data used in the evaluation and computes the shared expression from the underlying data. The storage layer then stores the result in a target worked data block. When a rowsource includes the shared expression, the database server submits a worked data block request to the storage device to retrieve the evaluated expression. The storage device accesses and returns the target worked data block to the database server. Thus, the compute responsibility for evaluating shared expressions is offloaded from the database server to the storage layer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
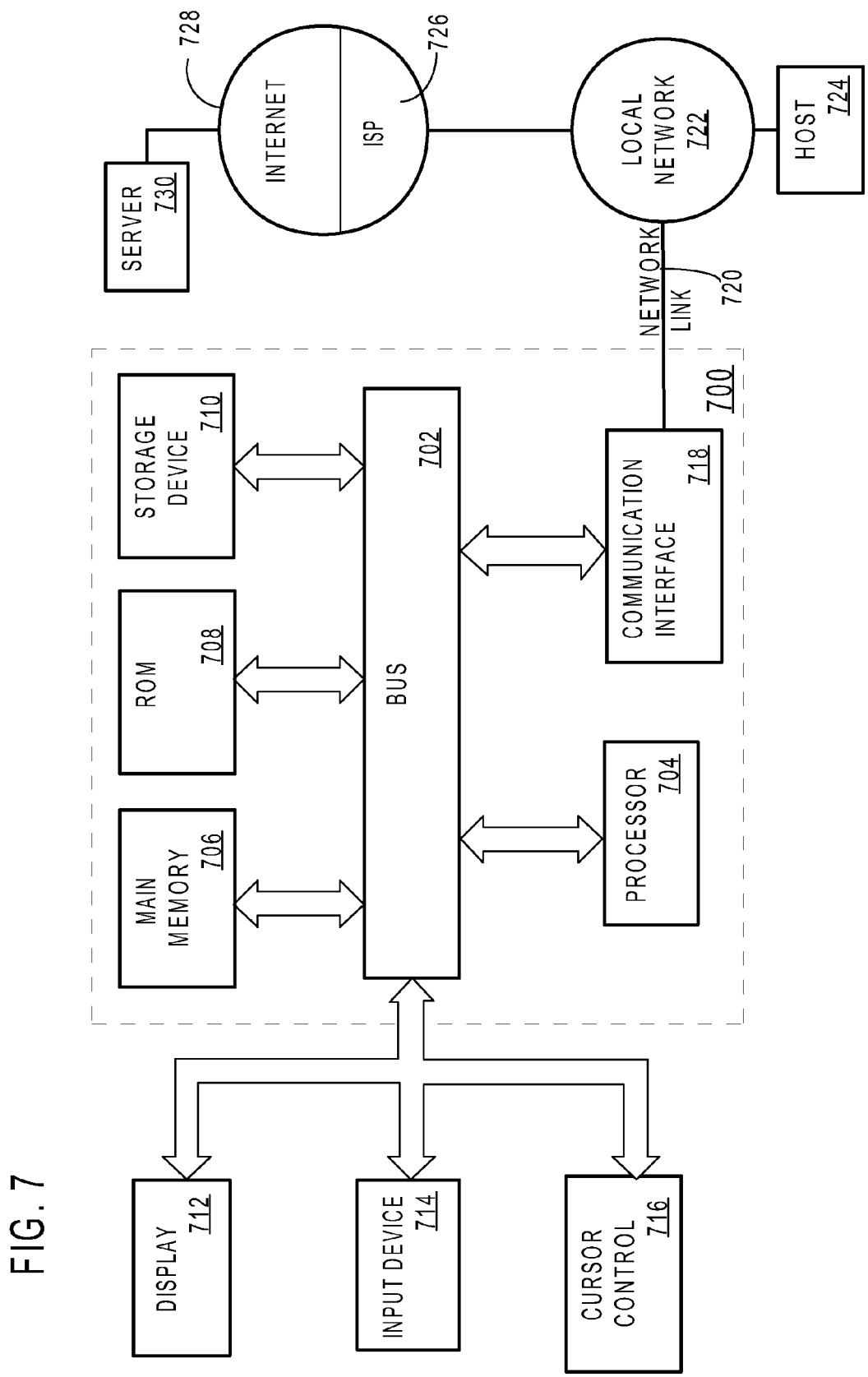
FIG. 7 is a block diagram depicting a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for optimizing query execution, the method comprising:
   identifying, in a query execution plan compiled for a query, a plurality of target operators that includes an expression that computes a common value;
   for a first target operator of the plurality of target operators, modifying a row output of the first target operator to add a column for an evaluation result comprising the common value;
   for at least one second target operator of the plurality of target operators, modifying a row input of the second target operator to add a column for the evaluation result comprising the common value;
   after modifying the row output for the first target operator and the row input for at least the second target operator, executing the query according to the plurality of target operators;
   wherein during said executing, the evaluation result comprising the common value is shared by passing the evaluation result from the row output for the first target operator to the row input for the at least one second target operator;
   wherein the method is performed by one or more computing devices.

2. The method of claim 1, further comprising:
   pushing evaluation of the expression to a storage layer;
   wherein the storage layer evaluates the expression that computes the common value during a table scan of stored data indicated by the expression;
   wherein during said executing, a database management system retrieves the evaluation result of the expression from the storage layer.

3. The method of claim 2, wherein the storage layer returns a set of rows that includes the evaluation result comprising the common value.

4. The method of claim 1, wherein the expression is a hash expression that computes a common hash value on a common hash key.

5. The method of claim 1, wherein identifying the plurality of target operators comprises:
   traversing operators of a query execution tree corresponding to the query execution plan to identify a first operator;
   wherein the particular operator includes an expression for computing a hash value from a particular hash key;
   traversing a subtree of the query execution tree using the particular operator as a root to identify one or more additional operators, wherein the one or more additional operators also include an expression for computing the hash value on the particular hash key.

6. The method of claim 1, further comprising:
   for one or more target operators of the plurality of target operators, replacing the expression with a reference to a shared expression;
   wherein the reference to the shared expression causes a respective target operator to access the evaluation result without computing the evaluation result.

7. The method of claim 1, further comprising
   assigning responsibility for evaluating the expression to a single target operator of the plurality of target operators.

8. The method of claim 1,
   wherein the plurality of target operators includes different target operators;
   wherein the first target operator of the plurality of target operators uses the evaluation result to perform a first type of operation;
   wherein the second target operator of the plurality of target operators uses the evaluation result to perform a second type of operation;
   wherein the first type of operation is different than the second type of operation.

9. The method of claim 1, wherein the plurality of target operators includes two or more of: a hash join, a hash group by, a bloom filter, or an output table queue.

10. The method of claim 1, further comprising:
    determining whether a number of target operators identified satisfies a threshold;
    wherein the first target operator and the second target operator are modified in response to determining that the number of target operators identified satisfies the threshold.

11. The method of claim 1, wherein:
    the common value is a hash value;
    the first target operator computes the hash value.

12. One or more non-transitory computer-readable media storing sequences of instructions, which, when executed by one or more processors, cause:
    identifying, in a query execution plan compiled for a query, a plurality of target operators that includes an expression that computes a common value;
    for a first target operator of the plurality of target operators, modifying a row output of the first target operator to add a column for an evaluation result comprising the common value;
    for at least one second target operator of the plurality of target operators, modifying a row input of the second target operator to add a column for the evaluation result comprising the common value;
    after modifying the row output for the first target operator and the row input for at least the second target operator, executing the query according to the plurality of target operators;
    wherein during said executing, the evaluation result comprising the common value is shared by passing the evaluation result from the row output for the first target operator to the row input for the at least one second target operator.

13. The one or more non-transitory computer-readable media of claim 12, wherein the sequences of instructions further include instructions that, when executed by said one or more processors, cause:
    pushing evaluation of the expression to a storage layer;
    wherein the storage layer evaluates the expression that computes the common value during a table scan of stored data indicated by the expression;
    wherein during said executing, a database management system retrieves the evaluation result of the expression from the storage layer.

14. The one or more non-transitory computer-readable media of claim 13, wherein the sequences of instructions further include instructions that, when executed by said one or more processors, cause the storage layer to return a set of rows that includes the evaluation result comprising the common value.

15. The one or more non-transitory computer-readable media of claim 12, wherein the expression is a hash expression that computes a common hash value on a common hash key.

16. The one or more non-transitory computer-readable media of claim 12, wherein instructions for identifying the plurality of target operators comprise instructions for:
  traversing operators of a query execution tree corresponding to the query execution plan to identify a first operator;
  wherein the first operator includes an expression for computing a hash value from a particular hash key;
  traversing a subtree of the query execution tree using the first operator as a root to identify one or more additional target operators that also include an expression for computing the hash value on the particular hash key.

17. The one or more non-transitory computer-readable media of claim 12, further storing instructions that cause:
  for one or more target operators of the plurality of target operators, replacing the expression with a reference to a shared expression;
  wherein the reference to the shared expression causes a respective target operator to access the evaluation result without computing the evaluation result.

18. The one or more non-transitory computer-readable media of claim 12, further storing instructions that cause:
  assigning responsibility for evaluating the expression to a single target operator of the plurality of target operators.

19. The one or more non-transitory computer-readable media of claim 12,
  wherein the plurality of target operators includes different target operators;
  wherein the first target operator of the plurality of target operators uses the evaluation result to perform a first type of operation;
  wherein the second target operator of the plurality of target operators uses the evaluation result to perform a second type of operation;
  wherein the first type of operation is different than the second type of operation.

20. The one or more non-transitory computer-readable media of claim 12, further storing instructions that cause:
  determining whether a number of target operators identified satisfies a threshold;
  wherein the first target operator and the second target operator are modified in response to determining that the number of target operators identified satisfies the threshold.

21. The one or more non-transitory computer-readable media of claim 12, wherein the plurality of target operators includes two or more of: a hash join, a hash group by, a bloom filter, or an output table queue.

* * * * *

UNITED STATES PATENT AND TRADEMARK OFFICE
CERTIFICATE OF CORRECTION

PATENT NO. : 9,773,041 B2
APPLICATION NO. : 13/787663
DATED : September 26, 2017
INVENTOR(S) : Cruanes et al.

Page 1 of 1

It is certified that error appears in the above-identified patent and that said Letters Patent is hereby corrected as shown below:

On the Title Page

On page 2, Column 2, under Other Publications, Line 1, delete ""Fundatmentals" and insert -- "Fundamentals --, therefor.

Signed and Sealed this
Fifth Day of June, 2018

Andrei Iancu
*Director of the United States Patent and Trademark Office*